UNITED STATES PATENT OFFICE.

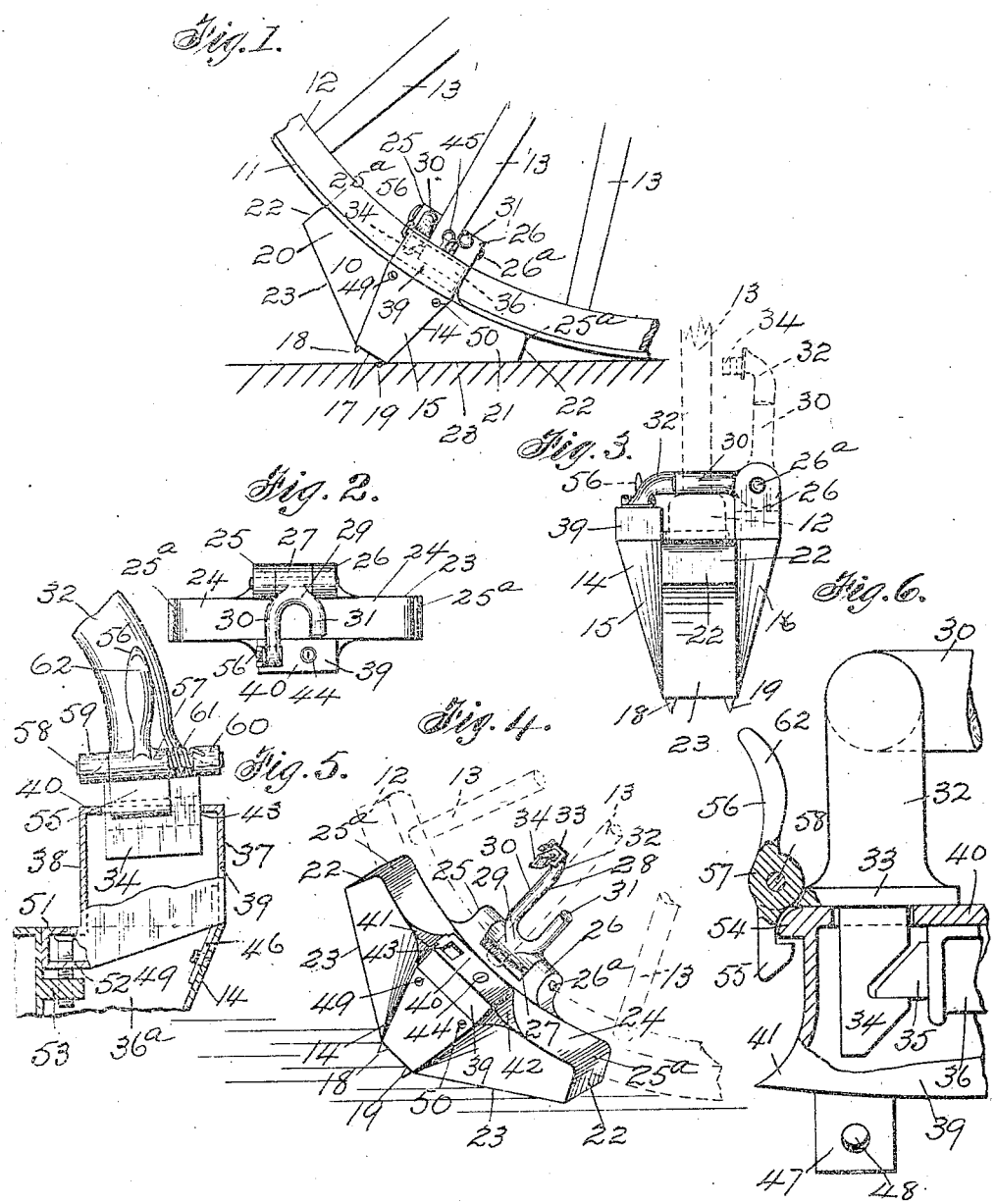

BENJAMIN SCHESTOPOL, OF NEW YORK, N. Y.

LOCK FOR BICYCLE OR OTHER WHEELS.

977,228.  Specification of Letters Patent.  Patented Nov. 29, 1910.

Application filed August 1, 1910. Serial No. 574,949.

*To all whom it may concern:*

Be it known that I, BENJAMIN SCHESTOPOL, a subject of the Czar of Russia, and a resident of New York, borough of Brooklyn, county of Kings, and State of New York, have invented certain new and useful Improvements in Locks for Bicycle or other Wheels, of which the following is a full, clear, and exact specification.

This invention relates more particularly to a class of devices for preventing an automobile or vehicle when at a standstill from being moved and wrongfully made use of.

My invention has for its primary object to provide an efficient lock or device which may be conveniently carried in an automobile or vehicle and is adapted to be readily applied to one of the wheels thereof and positively hold the same against movement so as to prevent wrongful use of the vehicle and especially an automobile, and this is accomplished by providing a wheel lock having a weighted body in one part of which is formed a cradle wherein the tire of the wheel is seated in a manner that the weighted body will be wedged between the wheel and surface of the ground should an attempt be made to move the vehicle.

Another object of the invention is to provide a form of locking means adapted to detachably connect the body of the device to a wheel and firmly secure the same in locked engagement.

Furthermore, my invention has for its object to provide a form of lock casing adapted to have fitted therein any preferred make of lock which may be operated only by a key in possession of the owner or chauffeur of the vehicle.

A practical embodiment of the invention is represented in the accompanying drawing forming a part of this specification in which similar characters of reference indicate corresponding parts in all the views, the said invention being more fully described hereinafter and then pointed out in the appended claims.

In the drawing, Figure 1 is a side view of my improved wheel lock applied to a wheel. Fig. 2 is a top plan of the lock. Fig. 3 is an end view of the lock. Fig. 4 is a perspective of the wheel lock in position to be applied to a wheel. Fig. 5 is a fragmentary sectional view of the lock casing, and Fig. 6 is a fragmentary side view, partly in section, of the forms of locking means.

In practice the device 10 is held in engagement with the tire 11 of the rim 12 by being locked to one of the spokes 13 of the wheel of a wagon, or automobile, or like vehicle. The device 10 has a body 14 provided with side faces or surfaces, as 15 and 16, which are disposed in substantially a V-shape, as shown in Fig. 3, and at the apex of said surfaces is formed a knee 17 upon which is formed a plurality of spurs, as 18 and 19. Extending in opposite directions from the body 14 are two arms 20 and 21, formed integrally with said body, and these parts are preferably of metal which may be cast or otherwise made so as to be of the required weight. Each of the arms 20 and 21 is rectangular and tapered in form, and has an end face 22, a face or surface upon the underside thereof, as 23, and a top face or surface 24. The top surface 24 of each of said arms is correspondingly curved in the same degree as the curvature of a wheel to provide an efficient cradle or seat in which may rest the tire of a wheel, and to prevent injury to a pneumatic tire of an automobile, for instance, the upper edge of each of the end faces 21 is rounded or cutaway, as at 25$^a$. The faces 23 of the tapered arms 20 and 21 are disposed in substantially a V-shape crosswise formation with respect to the body 14 so that one of said tapered arms will be wedged between the tire of the wheel and surface of the ground, as illustrated in Figs. 1 and 4, and thereby prevent the vehicle from being moved.

At one end upon the top of the body 14 are arranged two lugs, 25 and 26, having an opening therein through which is passed a pintle 26$^a$. Upon the pintle 26$^a$ and between the lugs 25 and 26 is pivoted the apertured lug 27 of a locking element 28 for detachably connecting the device to the wheel of a vehicle. Formed upon the apertured lug 27 is a substantially U-shaped body 29 from which extend two parallel arranged arms 30 and 31 adapted to straddle one of the spokes 13 in fastening the device upon a wheel. The arm 30 is somewhat longer than the arm 31 and is curved as at 32 so as to overlap the rim 12 of the wheel. A cap or flange 33 is provided at the end of the curved part 32 of the arm 31, and from the surface of said cap opposite to the curved part 32 is arranged a notched clip 34 adapted to engage the tongue 35 of a lock 36, Fig. 6, for securing the locking element 28 in locked engagement with the body 14.

The top of the body 14 at the end opposite to the lugs 25 and 26 is recessed, as at 36ª, for reception of a lock casing 37. The lock casing 37 is substantially rectangular in form having two parallel arranged side walls 38 and 39, a top plate 40 and substantially cone shaped ends 41 and 42. In one end of the top plate 40 is formed an opening 43 for passage therethrough of the notched clip 34 of the locking element 28, and approximately midway of said plate is provided a keyhole 44 through which a key, as 45 Fig. 1, may be passed. To the surface of the top plate 40 within the lock casing 37 is fastened in any suitable manner the lock 36 which may be of any well known make or preferably a form of lock operated by special keys retained by the owner or chauffeur of the vehicle. Upon the inner surface of the wall 39 of the lock casing 37 are provided lugs 46 and 47, Figs. 5 and 6, each of which has an opening therethrough, as 48, for the passage of a bolt, as 49 and 50, by which one part of said casing is fastened to the body 14, and upon the lower end of the wall 38 is formed an angular flange or projecting part 51 through which is provided an opening for passage of a screw or bolt 52 which engages a lug or flange 53 formed upon the surface of the body 14 interiorly of the recess 36ª so as to firmly connect the opposite part of the lock casing 37 to said body.

For the purpose of locking the device to a wheel without the use of the lock 36 and key 45 I provide upon top plate 40 at the end 41 a lip or flange 54, Fig. 6, which is adapted to be engaged by the notched-finger 55 of a snap-catch 56. The snap-catch 56 has a tubular body 57 hinged upon a pin 58 which is directed through openings in lugs 59 and 60 formed upon one end of the flange 33 of the curved part 32 of the arm 31. Held upon the pin 58 is a spiral spring 61 having one end engaging the tubular body 57 and the other end thereof secured to one of the lugs 60 and said spring tends normally to force the notched finger 55 into locking engagement with the flange 54. Obviously by providing this form of locking means the arm 31 may be readily locked to the body 14, and to permit the arm 31 to be conveniently unlocked from said body a finger or handle, as 62, is arranged upon the tubular body 57 opposite to the notched-finger 55. By manually directing the handle 62 toward the arm 31 the body 57 will turn on the pivot 58 and the notched-finger 55 will be guided from engagement with the lip 54, and the locking element 28 may then be swung free of the spoke 13.

It is to be understood that changes may be made in the form of my improved wheel lock, or in the proportions of the component parts thereof without departing from the scope and spirit of the invention, therefore I do not wish to be limited to the particular form of lock herein described and shown.

Having thus described my invention, I claim as new and desire to secure by Letters Patent:

1. A wheel lock of the character described, comprising a body; a tapered arm formed upon said body, said arm having a curved top surface and a flat face upon the underside thereof; a locking element hinged upon one part of the body and adapted to straddle a spoke and overlap the rim of a wheel; and means formed upon an opposite part of the body and adapted to lock the locking element and said body together.

2. A wheel lock of the character described, comprising a body; two tapered substantially rectangular arms provided upon said body and disposed in opposite directions, each of said arms having a curved top face and a flat face upon the underside thereof; a substantially U-shaped locking element having a lug hinged upon one part of the body; a recess formed in an opposite part of the body; a casing held in the recess; a lock fastened interiorly of the casing; and means formed upon the U-shaped locking element and adapted to engage the lock in locking engagement.

3. A wheel lock of the character described, comprising a substantially V-shaped body; two substantially rectangular tapered arms formed upon the body and disposed in substantially V-shaped arrangement in opposite directions crosswise of said body, each of said arms having a top surface curved in conformity with the curvature of the tire of a wheel; a locking element having a lug pivoted upon one end of the V-shaped body; one long arm and one short arm arranged in U-shaped formation provided upon the lug; a notched-clip formed upon one end of the long arm; a recess provided in the opposite end of the V-shaped body; a casing held within the recess and having a top plate in which is formed an opening and a keyhole; a lock held to the top plate interiorly of the casing and having a tongue adapted to be engaged by the notched clip upon the end of the long arm of said locking element.

4. A wheel lock of the character described, comprising a substantially V-shaped body; two arms formed upon the body and disposed in substantially V-shaped arrangement in opposite directions crosswise of said body, each of said arms having a top face curved to conform with the curvature of the tire of a wheel; two parallel arranged lugs provided upon one end of the body; a lug pivotally held between the two lugs; one long curved arm and one short arm formed in spaced apart arrangement upon the pivoted lug between said two lugs; two parallel arranged lugs provided upon the end of the curved long arm; a catch pivoted between the lugs of the curved arm; a casing held upon the end of the V-shaped body; a lip formed upon one part of the casing and adapted to be engaged by the catch to lock the long curved arm to said casing.

5. In a wheel lock, in combination, a substantially V-shaped body having two opposed side faces and a knee formed at the apex of the side faces; two spurs provided upon the knee; a locking element having a body hinged to one part of the top of the V-shaped body; a curved long arm formed upon the body and adapted to overlap the rim of a wheel; a curved short arm also formed upon said body and spaced apart from the long arm whereby the two arms may straddle the spoke of a wheel; a flange provided upon the free end of the long arm; a notched-clip projecting from the face of the flange opposite to the long arm; a recess formed in the top of the V-shaped body opposite to the part hinged to the locking element; a substantially rectangular casing fastened in the recess and having a top plate in which is formed an opening and a key hole; and means held to the top plate within the casing and adapted to engage the notched-clip of said locking element to connect the wheel lock to a wheel.

6. In a wheel lock, in combination, a substantially V-shaped body having two opposed side faces and a knee formed at the apex of the side faces; a spur provided upon two of the opposed edges of the knee; two substantially rectangular tapered arms formed upon the body and disposed in a V-shaped arrangement crosswise of said body; a cradle in which the tire of a wheel may rest provided by a curved surface formed upon the tapered arms; a flat surface provided upon the underside of each of the tapered arms opposite to the cradle; a locking element hinged on the top at one side of the V-shaped body and adapted to overlap the rim of a wheel; a casing held upon the opposite side of the V-shaped body; means provided upon the free end of the locking element; and means provided within the casing and adapted to be engaged by the means of the locking element to connect the lock to a wheel.

7. In a wheel lock; the combination with a substantially V-shaped body; of a locking element consisting of a substantially U-shaped body; a lug formed upon one side of said body and having an opening therethrough for passage of a pin whereby said lug may be pivotally held between two lugs provided upon one side of the V-shaped body; a long arm projecting from the U-shaped body and having a curved end; a flange formed upon the curved end; a notched clip extending from the surface of the flange opposite to the curved end; a short arm formed upon the U-shaped body and spaced apart from the long arm; two lugs formed upon one side of the flange of the long arm; a pivoting pin held in the lugs; a circular body pivoted upon the pivoting pin; a notched finger formed upon the underside of the body; a finger provided upon the top of the body; a spiral spring held upon the pivoting pin; locking means provided upon the V-shaped body and adapted to be engaged by the notched clip extending from the flange of the long arm; and locking means also provided upon the V-shaped body and adapted to be engaged by the notched-finger underneath the body which is pivoted between the lugs formed upon the side of the flange of said long arm.

This specification signed and witnessed this thirtieth day of July A. D. 1910.

BENJAMIN SCHESTOPOL.

Witnesses:
 ROBT. B. ABBOTT,
 S. SAHNER.